US005183133A

United States Patent [19]

Roy et al.

[11] Patent Number: 5,183,133

[45] Date of Patent: Feb. 2, 1993

[54] MOTOR-DRIVEN CHAIR

[75] Inventors: Orest Z. Roy; Raymond E. Fulford; Jules O. Legal, all of Winnipeg, Canada

[73] Assignee: Canadian Aging & Rehabilitation Product Development Corporation, Winnipeg, Canada

[21] Appl. No.: 668,866

[22] Filed: Mar. 13, 1991

[51] Int. Cl.[5] .......... B60K 17/30

[52] U.S. Cl. .......... 180/252; 180/13; 180/23; 180/65.5; 180/907; 310/67 R

[58] Field of Search .......... 180/252, 253, 264, 65.5, 180/907, 23, 13, 12, 11; 280/92, 87.1, 771, 78; 310/67 R; 297/DIG. 4

[56] References Cited

U.S. PATENT DOCUMENTS

| | | | |
|---|---|---|---|
| 641,603 | 1/1900 | Newman et al. | 310/67 R |
| 680,804 | 8/1901 | Newman et al. | 310/67 R |
| 1,090,583 | 3/1914 | Church | 310/67 R |
| 1,172,456 | 2/1916 | Hoadley | 310/67 R |
| 2,608,598 | 8/1952 | Hawkins et al. | 180/10 |
| 3,163,250 | 12/1964 | Gibson | 180/65.5 X |
| 3,387,681 | 6/1968 | Rabjohn | 180/13 |
| 3,802,524 | 4/1974 | Seidel | 180/6.5 |
| 4,021,690 | 5/1977 | Burton | 310/67 R |
| 4,403,673 | 9/1983 | Ball | 180/214 |
| 4,475,613 | 10/1984 | Walker | 180/22 |
| 4,513,832 | 4/1985 | Engman | 180/6.5 |
| 4,519,466 | 5/1985 | Shiraishi | 180/252 X |

FOREIGN PATENT DOCUMENTS

| | | | |
|---|---|---|---|
| 338689 | 10/1989 | European Pat. Off. | 180/907 |
| 63575 | 4/1983 | Japan | 180/907 |
| 2123362 | 2/1984 | United Kingdom | 180/65.5 |

OTHER PUBLICATIONS

Copy of article entitled "Five-Wheel Unicycle System" (4 pages)-Medical & Biological Engineering & Computing Nov. 1985 pp. 593-596 vol. 23.

*Primary Examiner*—Margaret A. Focarino
*Assistant Examiner*—Kevin Hurley
*Attorney, Agent, or Firm*—Adrian D. Battison; Stanley G. Ade; Murray E. Thrift

[57] ABSTRACT

A motorized wheel assembly is provided in which there is a seat for receiving the occupant attached to a vertical shaft with a single central wheel mounted at the bottom of the shaft for rotation about a horizontal axis transverse to the chair and defining a direction of forward movement of the wheel forwardly of the chair. On the chair and the shaft is carried a battery and control unit for supplying power to the drive motor of the wheel mounted on the hub of the wheel. An outrigger frame includes a sleeve slideable on the shaft and a plurality of arms extending outwardly from the sleeve each arm carrying a castor wheel to prevent toppling of the device. Steering is achieved by the feet of the user applied to the outrigger frame to rotate the chair and the drive-wheel about a vertical axis. The motor in a hub design of the wheel is achieved by providing a cylindrical housing surrounding the motor with annular bearings on the outer peripheral surface of the housing carrying the rim of the wheel which directly surrounds the housing. An output shaft at one end of the housing drives the rim through a coupling extending around the housing.

12 Claims, 4 Drawing Sheets

MOTOR-DRIVEN CHAIR

FIELD OF THE INVENTION

The present invention relates to a motor-driven chair and to a drive wheel assembly therefor.

BACKGROUND OF THE INVENTION

One example of a motor-driven chair designed particularly for handicapped people is described in a paper dated November 1985 published in Medical and Biological Engineering and Computing by O. Z. Roy et al which relates to an omnidirectional power lab stool.

This device includes a central driven wheel positioned beneath the seat and acting as a main support for the seat. An outrigger frame is positioned around the central wheel and includes a base and turntable on which are mounted four ground wheels spaced around the central wheel. Three of the wheels are castor wheels which are free floating. The fourth wheel is directionally fixed and acts as a rudder for straight-line travel. The base and turntable are rotatable relative to the seat and the central wheel. The central wheel is fixed in direction relative to the seat. The base and turntable are connected to a hoop which surrounds the seat so that the seated occupant is enclosed by the hoop. The hoop is coupled to stand at one side. A drive motor is mounted on the central wheel and extends outwardly from the hub for providing motive power to the drive wheel. A battery mounted on the turntable supplies power to the motor.

This device is simply a prototype proposal and did not achieve any commercial success. It has a number of significant disadvantages. Firstly, the wheel designed is relatively crude and necessitates a bulky motor arrangement coupled on one side of the wheel which interferes with the compact design of the device including the base and turntable arrangement. Secondly the hoop is a major disadvantage in that it is aesthetically very distracting and since it makes it very difficult for even an able bodied user to enter the seat without discomfort. The hoop is however necessary to locate the chair relative to the turntable to prevent multiple rotation of the chair relative to the turntable which would thus twist the wires from the battery to the motor. Furthermore the device is difficult to handle and manouver when there is no occupant.

Further designs of chairs are shown in U.S. Pat. Nos. 4,403,673 (Ball); 4,475,613 (Walker); 3,387,681 (Rabjohn), 3,802,524 (Seidel); and 4,513,832 (Engman). However none of these devices is relevant to the design of the above device or solves any of the difficulties associated with the design.

One of the problems of the above design is the unsatisfactory nature of the wheel and motor construction which is extremelly bulky and thus complicates the construction of the device particularly in the area of the outrigger frame. Attempts have been made to design an arrangement in which the motor for driving the wheel is positioned within the hub of the wheel since this can provide a very compact arrangement particularly suitable for the above design of motorized chair. However a motor-in-the-hub design can also be used in other designs of motorized chair or motorized vehicle with significant advantages of compactness and ease of operation.

Some designs have already been proposed for motor-in-the-hub wheel drive arrangements but these are highly complicated and therefore very costly to manufacture and it is believed that none is commercially successful or has been manufactured on a commercial scale. Various proposals are shown in all U.S. Pat. Nos. 641,603 (Newman); 680,804 (Newman); 1,090,684 (Church); 1,172,456 (Hoadley); 2,608,598 (Hawkins) and more recent U.S. Pat. No. 4,021,690 (Burton). However, as stated above all these devices are highly complicated leading to devices which cannot be manufactured on a commercial scale.

SUMMARY OF THE INVENTION

It is one object of the present invention, therefor to provide an improved motorized chair.

It is a second object of the present invention to provide an improved design of motor-in-the-hub wheel construction which can be suitable for the motorized chair or for the uses.

According to the invention, therefor there is provided a motor-driven chair comprising a seat element having support surfaces for receiving and supporting an occupant of the chair, first wheel for running on the ground, means mounting the seat element above the first wheel so that the weight from the occupant is applied downwardly onto the wheel for support thereby, the first wheel having a horizontal axis of rotation defining a direction of forward motion lying at right angles to the axis with the orientation of the direction of forward motion being fixed relative to the seat element such that rotation of the seat element about a vertical axis rotates in the direction of forward motion about the vertical axis, an outrigger frame having a plurality of freely rotatable second wheels thereon at spaced positions around the first wheel, means mounting the outrigger frame on the seat element for rotation relative thereto about a vertical axis and for support of the seat element by the second wheels to prevent toppling of the seat element away from a position above the first wheel, a motor for driving the first wheel for rotation thereof about the horizontal axis, a battery for supplying power to the motor, means selectively actuable by the occupant to activate said motor, means for rotating the seat element and the first wheel about a vertical axis relative to the outrigger frame so as to change the orientation of the seat element and the direction of forward motion relative to the outrigger frame and the ground and means mounting the battery and the motor on a common support structure with said seat element and said first wheel for common rotation about said vertical axis.

According to another object of the present invention there is also provided a chair wherein the housing encloses a motor, a reduction gear coupling mounted on an end of the motor and a clutch member connected between the gear coupling and the output member.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
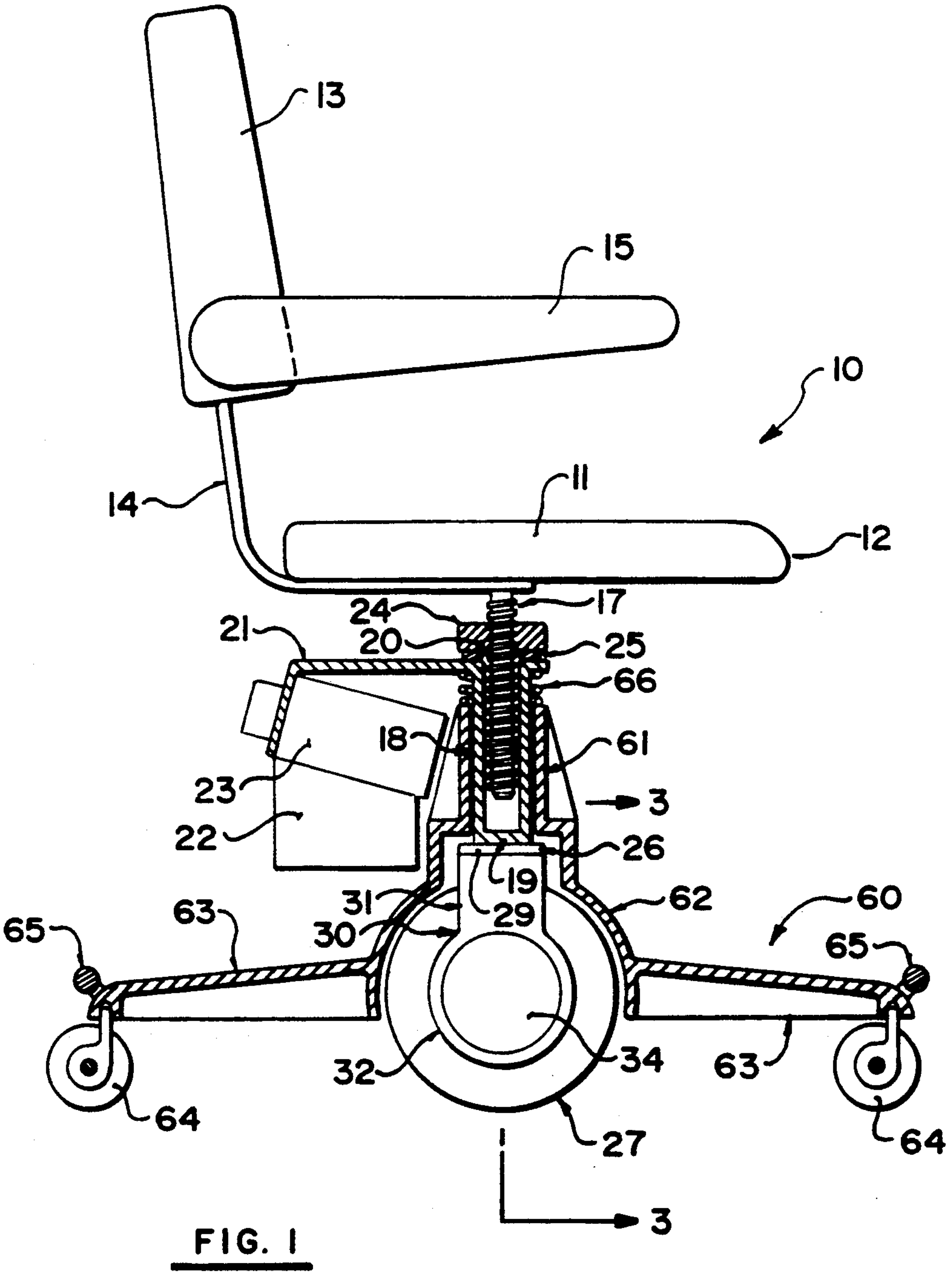
FIG. 1 is a cross sectional view taken along a vertical symmetrical plane of a motorized chair according to the present invention.
Figure 2:
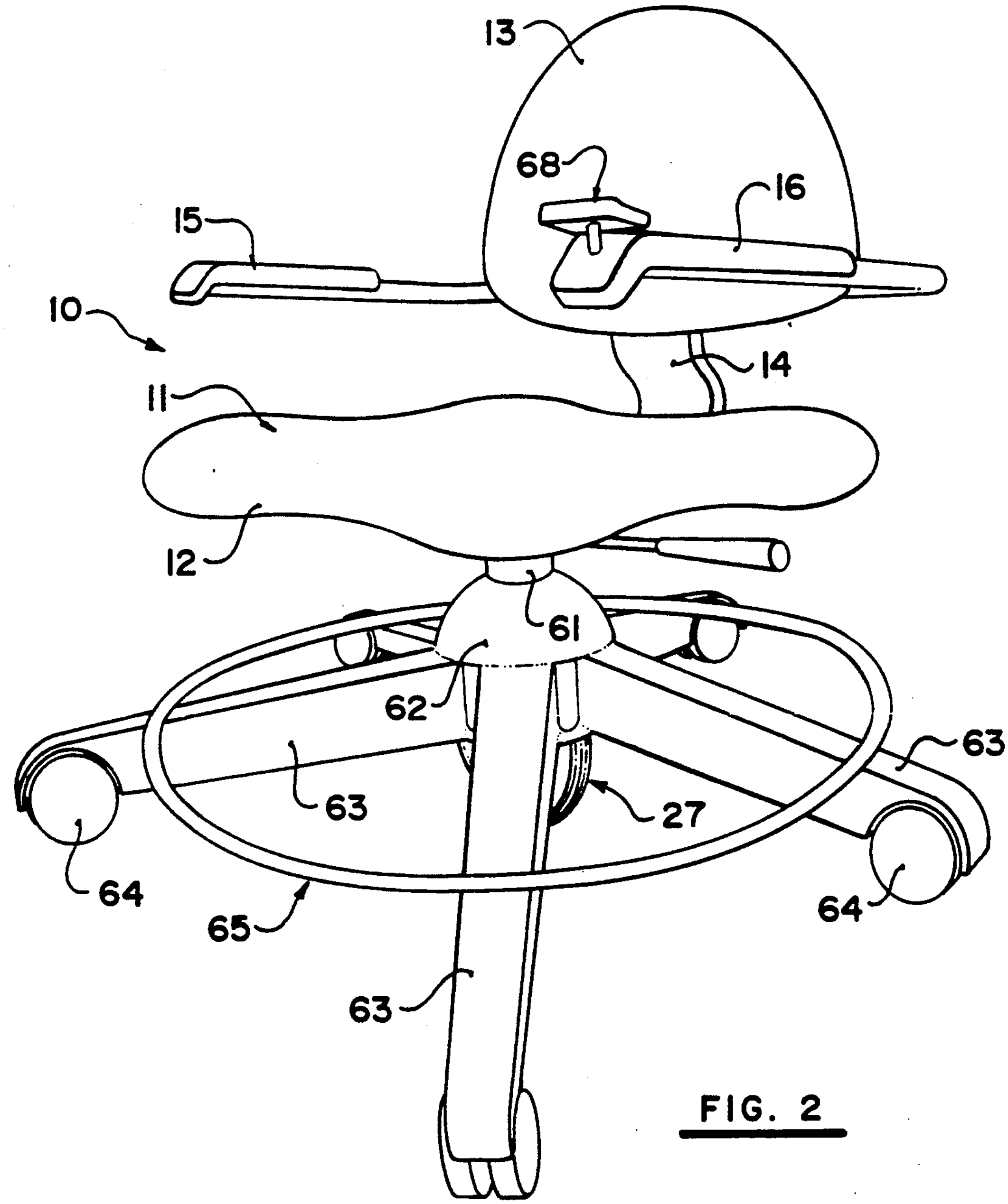
FIG. 2 is a perspective view of the chair of FIG. 1.

The chair shown in FIGS. 1 and 2 comprises a seat element generally indicated at 10 including a horizontal seat bottom 11 onto which the occupant can sit so as to be supported by the seat bottom 11 with the posterior of the occupant at the rear of the seat bottom and the legs of the occupant depending over a front edge 12 of the seat bottom. At the rear of the seat bottom is mounted a seat back 13 carried on a suitable vertical support 14 with arms 15 and 16 connected to the seat back 13 and extending from the sides of the seat back forwardly along the sides of the seat bottom in conventional manner. The occupant can therefore simply enter the seat element by backing onto the seat and sitting onto the seat in the conventional manner withount any further difficulties.

Figure 3:
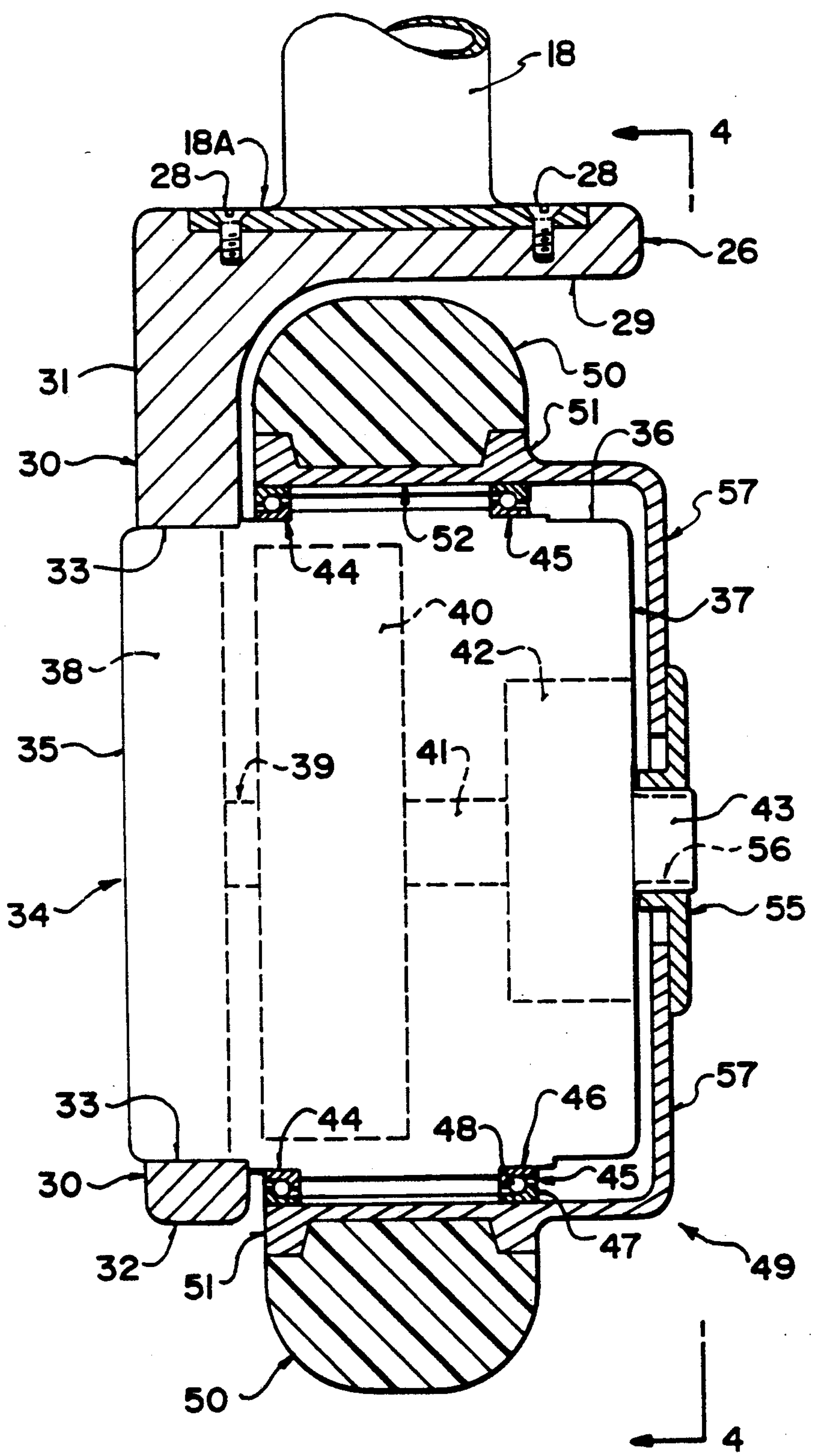
FIG. 3 is a cross sectional view taken along the lines 3—3 of FIG. 1 showing the motor, gear box and clutch arrangement only schematically.
Figure 4:
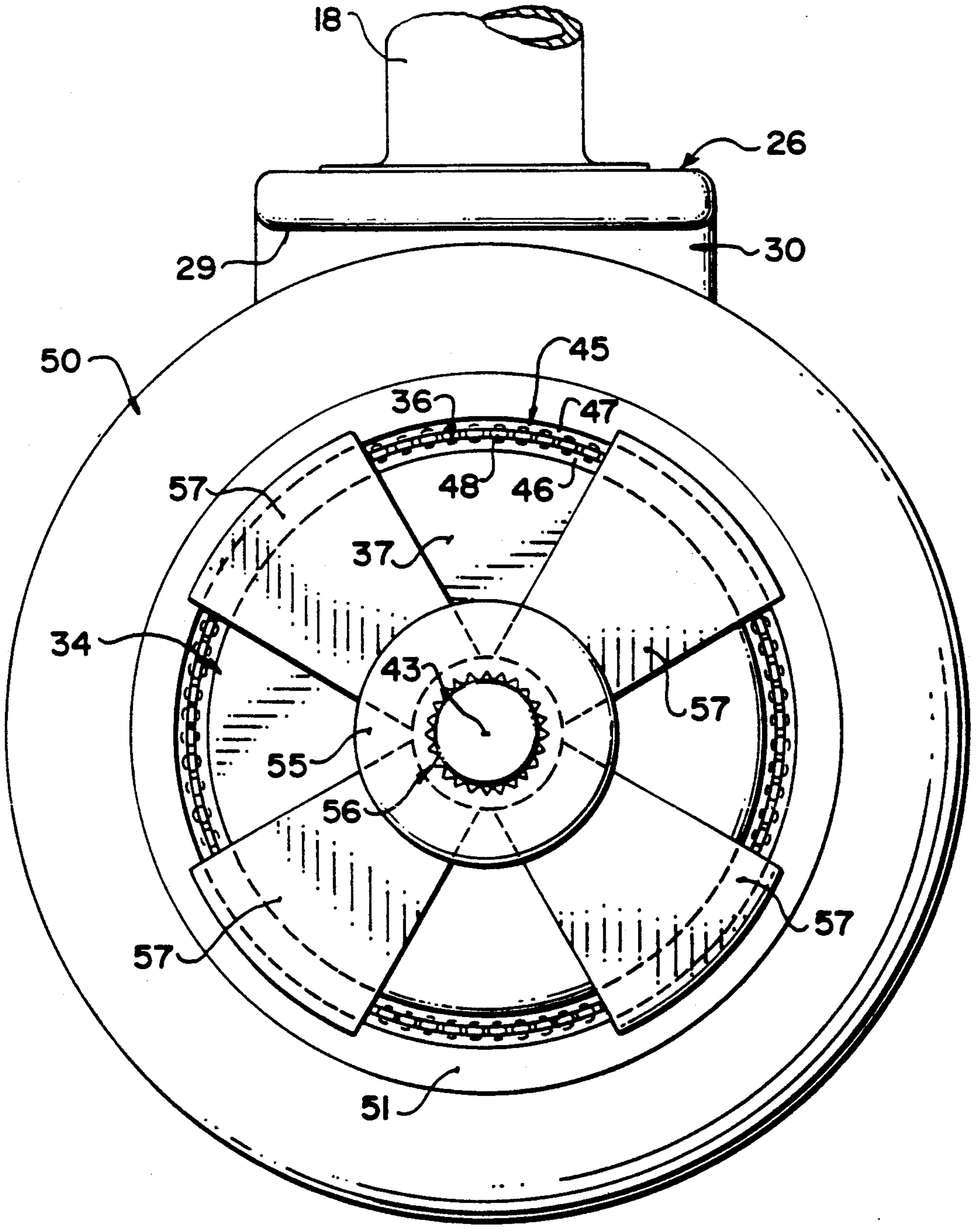
FIG. 4 is a view along the lines of 4—4 of FIG. 3.

The seat element 10 is mounted upon a vertical shaft 17 coupled to the underside of the seat bottom in conventional manner to provide sufficient strength to accommodate the weight of the occupant without breaking or significant flexing. The shaft 17 carries an external screw thread. The shaft is threadeably engaged into a cup 18 in the form of a cylindrical body having a closed lower end 19. The cup 18 carries, at an open upper end 20, a plate 21 which closely surrounds the shaft and which projects outwardly from one side of the shaft to act as a support element for a battery pack 22 and a control unit 23 both of which are shown only schematically. The cup 18 and the plate 21 are thus effectively integral. The cup is clamped to the threaded shaft 17 by a nut 24 which can be screwed down to clamp a washer 25 against the upper surface of the plate 21 thus holding the seat element, the shaft, the plate, the battery and the control unit as an integral item for a common rotation about the vertical axis of the shaft. The closed lower end 19 of the cup 18 is attached to a bracket 26 carrying a first wheel 27. The bracket is shown in more detail in FIGS. 3 and 4. In these Figures it will be noted that the lower end of the cup 18 includes an end plate 18A defining a peripheral flange which is attached to the bracket 26 by machine screws 28. The bracket 26 includes a horizontal upper plate 29 which couples to a vertical plate 30 extending downwardly from one side of the plate 29. The plate 30 as shown in FIG. 1 includes an upper portion 31 having parallel sides equal in width to the parallel sides of the upper plate 29. The lower part of the plate 30 widens into a circular disc 32 integral with the upper part 31 and having a central opening 33. The central opening surrounds a cylindrical housing 34 containing a motor. The cylindrical housing includes an end plate 35, a cylindrical wall 36 and a second end plate 37. Within the housing is mounted a motor schematically indicated at 38 having an output shaft 39 connected to a gear box 40 of a high reduction type. The gear box 40 has an output shaft 41 driving a clutch 42 and through the clutch a final drive shaft 43. The final drive shaft 43 projects through an opening in the housing at the end plate 37.

Upon the outer peripheral surface 36 of the housing there is provided a pair of annular bearings 44 and 45, each including an inner race 46 directly mounted upon the outer surface of the housing and an outer race 47. The outer race is freely rotatable around the axis of the output shaft 43 mounted on the inner race on ball bearings 48.

A wheel generally indicated at 49 includes a tire or peripheral member for engaging the ground and a rim 51 on which the tire is carried. The rim defines a sleeve 52 together with the necessary side flanges to receive and carry the tire 50. The sleeve 52 coaxially surrounds the outer surface 36 of the housing and is attached to the outer races 47 of the bearings 44 and 45. The sleeve 52 is thus freely rotatable relative to the outside surface of the housing about the axis of the shaft 43. The bearings 44 and 45 are positioned at either side of an imaginary extension of the shaft 18 so that the wheel is carried directly beneath the shaft 18. The horizontal axis of the shaft 43 is also directly beneath the shaft 18 at the centre of the housing 34. The axis of the shaft 43 is also fixed relatively to the shaft 18 by the rigid bracket 26 so that rotation of the chair about the vertical axis causes the wheel axis to rotate. The wheel of course defines the direction of forward movement of the wheel at right angles to the axis so this direction of forward movement also rotates with the chair and is directed exactly forwardly of the chair along a central line of the chair at a position that will project between the legs of the occupant in a direction of the occupant is normally facing.

Drive from the shaft 43 to the rim 51 is provided by a spider 54 having a central hub 55 resiliently coupled to the shaft 43 by splines 56. The resilient hub 55 communicates the drive to the spider 54 which includes a plurality of arms 57 projecting outwardly from the hub and integrally connected to the rim 52 leaving spaces 58 therebetween in which the front face 37 of the housing 34 is visible.

The motor and drive assembly are therefor wholly provided within the housing at a position inwardly of the hub of the wheel with the ends of the housing projecting outwardly from respective ends of the wheel to accomodate the drive system and the support system respectively of the wheel. The annular bearings surrounding the housing provide a particularly effective and simple design. The flexible connection between the shaft and the rim allows accomodation of any bending forces that may be generated under the load.

In an alternative arrangement (not shown), the annular bearing 45 is omitted and the wheel is supported by the annular bearing 44 and by a bearing supporting the shaft 43 relative to the housing. In this case a flexible coupling is not necessary.

As shown in FIG. 1, the main load of the seat and the occupant of the seat is applied downwardly through the shaft into the housing and into the wheel for support of the occupant from the ground.

In order to prevent toppling of the seat on the central wheel 27 there is provided an outrigger frame generally indicated at 60. The outrigger frame includes a sleeve 61 surrounding the cup 18 and slideable relative thereto in both the longitudinal and angular direction to allow rotation of the outrigger frame relative to the shaft and vertical movement of the outrigger frame relative to the central wheel 27. The sleeve is coupled at its lower end to a dome section 62 which extends over the wheel 27 and the bracket 26. The dome can be simply and conveniently shaped and take little space at the centre of the chair as shown in FIG. 2 in view of the compact design of the motor and wheel arrangement.

Attached to the lower part of the dome are four arms 63 which project outwardly from the dome at angularly spaced positions around the periphery. The arms are cantilevered from the dome. Each arm carries at its outer end a freely rotatable wheel 64 which is non driven and roll simply across the ground. Three of the wheels are castor wheels so that they can rotate to take up any required direction about a vertical castor shaft (not shown). The fourth of the wheels is fixed so its direction of forward movement lies along the length of the respective arm. A circular hoop 65 is connected to the arms at a position spaced outwardly from the dome 62 so as to provide a convenient footrest for the feet of the occupant.

Between the underside of the plate 21 and the top of the sleeve 61 is provided a spring 66 acting as a compression spring pushing the sleeve 61 downwardly relative to the shaft 18. The spring action causes the outrigger frame to be pressed downwardly toward the ground and the seat and wheel 27 to be drawn upwardly into the dome. In a position of the device in which the seat is unoccupied, therefor, the wheel 27 is lifted to a height above the lowermost edge of the wheels 64 so that only the wheels 64 rest upon the ground except when the seat is occupied.

In operation the occupant can simply enter the chair by the conventional manner stepping backwards and seating on the seat bottom. The feet of the occupant can then be lifted onto the outrigger frame and particularly the hoop 65. A control unit 68 is positioned on one of the arms of the chair for actuating the supply of power from the battery 22 through the control unit 23 to the motor 38. The occupant can therefor simply supply power to the motor to drive the central wheel 27. The weight of the occupant presses the wheel 27 downwardly and applies a significant downward force onto the wheel so that it engages the ground with friction to provide drive in the forward direction of the wheel. As described above, the forward direction of the central wheel lies directly forwardly of the chair. However the chair can be rotated relative to the ground by the occupant simply pushing on the outrigger frame with a relatively gentle force so that the outrigger frame remains at a particular orientation to the ground but the chair and the drive wheel rotate relative to the ground in order for the outrigger frame to steer the chair. This allows the chair basically to rotate about its own centre.

The mounting of the battery, control unit, motor, wheel and seat all on the same integral support structure ensures that device can fully rotate and there is no connection than the bearing connection between the outrigger and central support structure of the chair. There is therefor no restriction on the amount of rotation in one direction which can occur. The retraction of the central wheel into the dome ensures that when the occupant is removed, the device can simply be wheeled across the floor on the castor wheels.

The design of the motor in a hub drive system for the wheel can be used in other types of wheelchairs or in other articles for providing a simple compact design for driving the article across the ground.

Since various modifications can be made in my invention as hereinabove described, and many apparently widely different embodiments of same made within the spirit and scope, it is intended that all matter contained in the accompanying specification shall be interpreted as illustrative only and not in a limiting sense.

We claim:

1. A motor-driven chair comprising a seat element having support surfaces for receiving and supporting an occupant of the chair, first wheel for running on the ground, means mounting the seat element above the first wheel so that the weight from the occupant is applied downwardly onto the wheel for support thereby, the first wheel having a horizontal axis of rotation defining a direction of forward motion lying at right angles to the axis with the orientation of the direction of forward motion being fixed relative to the seat element such that rotation of the seat element about a vertical axis rotates in the direction of forward motion about the vertical axis, an outrigger frame having a plurality of freely rotatable second wheels thereon at spaced positions around the first wheel, means mounting the outrigger frame on the seal element for rotation relative thereto about a vertical axis and for support of the seat element by the second wheels to prevent toppling of the seat element away from a position above the first wheel, a motor for driving the first wheel for rotation thereof about the horizontal axis, a battery for supplying power to the motor, means selectively actuable by the occupant to activate said motor, the seat element and the first wheel being mounted on a common support, means for rotating the seat element and the first wheel on the common support about a vertical axis relative to the outrigger frame so as to change the orientation of the seat element and the direction of forward motion relative to the outrigger frame and the ground, and means mounting the seal element, the first wheel and the common support relative to said outrigger means so as to allow vertical movement between the outrigger frame and the first wheel and spring biasing means arranged to bias the first wheel upwardly relative to the outrigger frame such that when the weight of the occupant is removed from the seat element, the spring means retracts the first wheel to a height above the second wheels to allow free rolling rotation of the chair on the second wheels.

2. The chair according to claim 1 wherein the common support includes a vertical shaft, means connecting the vertical shaft to a hub of the wheel so that the shaft extends vertically above the wheel axis, a collar mounted on the shaft and means carried by the collar for supporting the battery.

3. The chair according to claim 2 wherein the outrigger frame includes a sleeve surrounding the shaft for rotation therearound.

4. The chair according to claim 3 wherein the spring biasing means is positioned between an upper end of the sleeve and the collar.

5. A motor-driven chair comprising a seat element having support surfaces for receiving and supporting an occupant of the chair, first wheel for running on the ground, means mounting the seat element above the first wheel so that the weight from the occupant is applied downwardly onto the wheel for support thereby, the first wheel having a horizontal axis of rotation defining a direction of forward motion lying at right angles to the axis with the orientation of the direction of forward motion being fixed relative to the seat element such that rotation of the seat element about a vertical axis rotates in the direction of forward motion about the vertical axis, an outrigger frame having a plurality of freely rotatable second wheels thereon at spaced positioned around the first wheel, means mounting the outrigger frame on the seat element for rotation relative thereto about a vertical axis and for support of the seat element by the second wheels to prevent toppling of the seat element away from a position above the first wheel, a motor for driving the first wheel for rotation thereof about the horizontal axis, a battery for supplying power to the motor, means selectively actuable by the occupant to activate said motor, the seat element and the first wheel being mounted on a common support, means for rotating the seat element and the first wheel on the common support about a vertical axis relative tot eh outrigger frame so as to change the orientation of the seat element and the direction of forward motion relative to the outrigger frame and the ground, wherein the outrigger frame is mounted wholly beneath the seat element such that steering of the chair obtained by engagement of the feet of the occupant on the outrigger frame.

6. The chair according to claim 5 wherein the outrigger frame includes a dome portion extending over and receiving the first wheel and a plurality of arms extending radially outwardly from the dome portion each arm carrying a respective one of the second wheels and a hoop member coupled to the arms adjacent outer ends thereof and defining a rest for the feet of the occupant.

7. A motor-driven chair comprising a seat element having support surfaces for receiving and supporting an occupant of the chair, first wheel for running on the ground, means mounting the seat element above the first wheel so that the weight from the occupant is applied downwardly onto the wheel for support thereby, the first wheel having a horizontal axis of rotation defining a direction of forward motion lying at right angles to the axis with the orientation of the direction of forward motion being fixed relative to the seat element such that rotation of the seat element about a vertical axis rotates in the direction of forward motion about the vertical axis, an outrigger frame having a plurality of freely rotatable second wheels thereon at spaced positions around the first wheel, means mounting the outrigger frame on the seat element for rotation relative thereto about a vertical axis and for support of the seat element by the second wheels to prevent toppling of the seat element away from a position above the first wheel, a motor for driving the first wheel for rotation thereof about the horizontal axis, a battery for supplying power to the motor, means selectively actuable by the occupant to activate said motor, the seat element and the first wheel being mounted on a common support, means for rotating the seat element and the first wheel on the common support about a vertical axis relative to the outrigger frame so as to change the orientation of the seat element and the direction of forward motion relative to the outrigger frame and the ground, wherein the first wheel comprises wheel peripheral member for engaging the ground, a wheel rim on which the peripheral member is mounted for rotation about an axis of the wheel rim, a motor and transmission assembly for driving the wheel, a motor within which the motor and transmission assembly is mounted, the motor and transmission assembly having an output member, means for communicating drive from the output member to the wheel rim for driving the peripheral member relative to the ground, at least a portion of the wheel rim coaxially surrounding a portion of the housing, and bearing means for supporting the wheel rim for rotation relative to the motor housing, the bearing means including an annular bearing member having an inner engagement surface in contact with said portion of the housing and coaxially surrounding the housing at said portion of the housing and an outer engagement surface in contact with said portion of the rim within said rim so as to support said portion of the rim for rotation about said portion of the housing.

8. The chair according to claim 7 wherein the housing is substantially cylindrical and wherein the said portion of the rim comprises a sleeve portion coaxially surrounding the cylindrical housing.

9. The chair according to claim 8 wherein the housing projects axially outwardly from each end of the rim.

10. The chair according to claim 9 including means for connecting the housing to said common support, said connecting means being connected to said housing at one end thereof, the output member comprising a drive shaft at an opposed end of the housing and said means for communicating comprising a member connected to said drive shaft and extending along said opposed end of said housing for engaging one end of the sleeve portion defining the rim;

11. The chair according to claim 8 including two annular bearings spaced axially and positioned between the cylindrical housing and the rim.

12. The chair according to claim 7 wherein the housing encloses said motor, a reduction gear coupling mounted on an end of the motor and a clutch member connected between the gear coupling and the output member.

* * * * *